(12) United States Patent
Gudi et al.

(10) Patent No.: US 11,710,007 B2
(45) Date of Patent: Jul. 25, 2023

(54) TRACKING A MOVEMENT STATUS OF A RADIO FREQUENCY IDENTIFICATION TAG

(71) Applicant: ZEBRA TECHNOLOGIES CORPORATION, Lincolnshire, IL (US)

(72) Inventors: Mukunda Gudi, Bangalore (IN); Jagadeesh Balakrishnan, Bangalore (IN); Suresh Ramamoorthy, Bangalore (IN); Rahul Sai Bachina, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/176,859

(22) Filed: Feb. 16, 2021

(65) Prior Publication Data

US 2022/0261562 A1 Aug. 18, 2022

(51) Int. Cl.
*G06K 7/10* (2006.01)
*G06K 19/077* (2006.01)

(52) U.S. Cl.
CPC ... *G06K 7/10366* (2013.01); *G06K 19/07762* (2013.01)

(58) Field of Classification Search
CPC .................. G06K 7/10366; G06K 19/07762
USPC .......................................................... 235/451
See application file for complete search history.

(56) References Cited

U.S. PATENT DOCUMENTS

| | | | |
|---|---|---|---|
| 10,733,620 B1 * | 8/2020 | Brakob ................ | G01S 13/751 |
| 10,957,173 B1 * | 3/2021 | Born .................... | G06Q 30/02 |
| 2018/0350218 A1 * | 12/2018 | Jeon .................... | G06K 7/10475 |
| 2019/0325173 A1 * | 10/2019 | Tingler ................. | G01S 5/02 |

\* cited by examiner

*Primary Examiner* — Ahshik Kim

(57) ABSTRACT

In some implementations, a system may receive, from a motion sensor, an inactivity indication that indicates a period of inactivity within a physical environment. The system may store, in a data structure, identifiers of a plurality of RFID tags that a tag reader read during the period of inactivity. The system may receive, from the motion sensor, a motion notification that indicates a period of activity within the physical environment. The system may cause the tag reader to collect an identifier of an RFID tag in the physical environment during the period of activity. The system may determine, based on the identifier and the identifiers of the plurality of RFID tags, a movement status associated with the RFID tag during the period of activity and perform an action associated with the movement status of the RFID tag.

20 Claims, 6 Drawing Sheets

US 11,710,007 B2

TRACKING A MOVEMENT STATUS OF A RADIO FREQUENCY IDENTIFICATION TAG

BACKGROUND

A radio frequency identification (RFID) system uses an RFID tag and an RFID reader that identifies the tag. The RFID reader may include one or more antennas that emit read signals and receive response signals from the RFID tag. The read signals may correspond to beacons to detect and/or identify RFID tags that are within a communication range of the RFID reader.

Based on characteristics of tag readings associated with received response signals from an RFID tag during a read window (e.g., a period of time after a read signal is emitted), the RFID reader may determine and/or indicate a location or a direction of movement of the RFID tag, relative to a location of the RFID reader. Accordingly, to accurately determine a location and/or a direction of movement of an RFID tag within an environment, there is a need for an RFID system to determine and/or verify that the readings of a read window accurately indicate the location and/or the movement of the RFID tag.

SUMMARY

In some implementations, a method for detecting a movement of an RFID tag among a plurality of stationary RFID tags includes monitoring a physical environment for motion based on first motion data from a motion sensor, wherein the first motion data is received from the motion sensor in association with a first time period and indicates inactivity within the physical environment; collecting, using a tag reader, first tag information associated with a first plurality of RFID tags, wherein the first tag information is collected during the first time period; designating, based on the first motion data, the first plurality of RFID tags as stationary; detecting, using the motion sensor, motion within the physical environment based on second motion data that indicates activity within the physical environment; collecting, using the tag reader, second tag information associated with a second plurality of RFID tags, wherein the second tag information is collected in association with a second time period that is associated with receiving the second motion data; determining, based on a comparison of the first tag information and the second tag information, that the motion involves the movement of the RFID tag during the second time period; and outputting tag data associated with the RFID tag.

In some implementations, a device includes one or more memories and one or more processors, communicatively coupled to the one or more memories, configured to: identify, using a tag reader, a first plurality of RFID tags that are stationary within a physical environment, wherein the first plurality of RFID tags are identified as stationary based on first tag information collected during a period of inactivity within the physical environment; detect, using a motion sensor, motion within the physical environment; collect, using the tag reader, second tag information associated with a second plurality of RFID tags, wherein the second tag information is collected in association with a period of activity that is associated with the motion; determine, based on the first tag information and the second tag information, that an RFID tag of the second plurality of RFID tags moved during the period of activity; and perform an action associated with indicating that the RFID tag moved during the period of activity.

In some implementations, a system includes a motion sensor; a tag reader; and a controller that is configured to: receive, from the motion sensor, an inactivity indication that indicates a period of inactivity within a physical environment; store, in a data structure, identifiers of a plurality of RFID tags that the tag reader read during the period of inactivity; receive, from the motion sensor, a motion notification that indicates a period of activity within the physical environment; cause the tag reader to collect an identifier of an RFID tag in the physical environment during the period of activity; determine, based on the identifier and the identifiers of the plurality of RFID tags, a movement status associated with the RFID tag during the period of activity; and perform an action associated with the movement status of the RFID tag.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1:
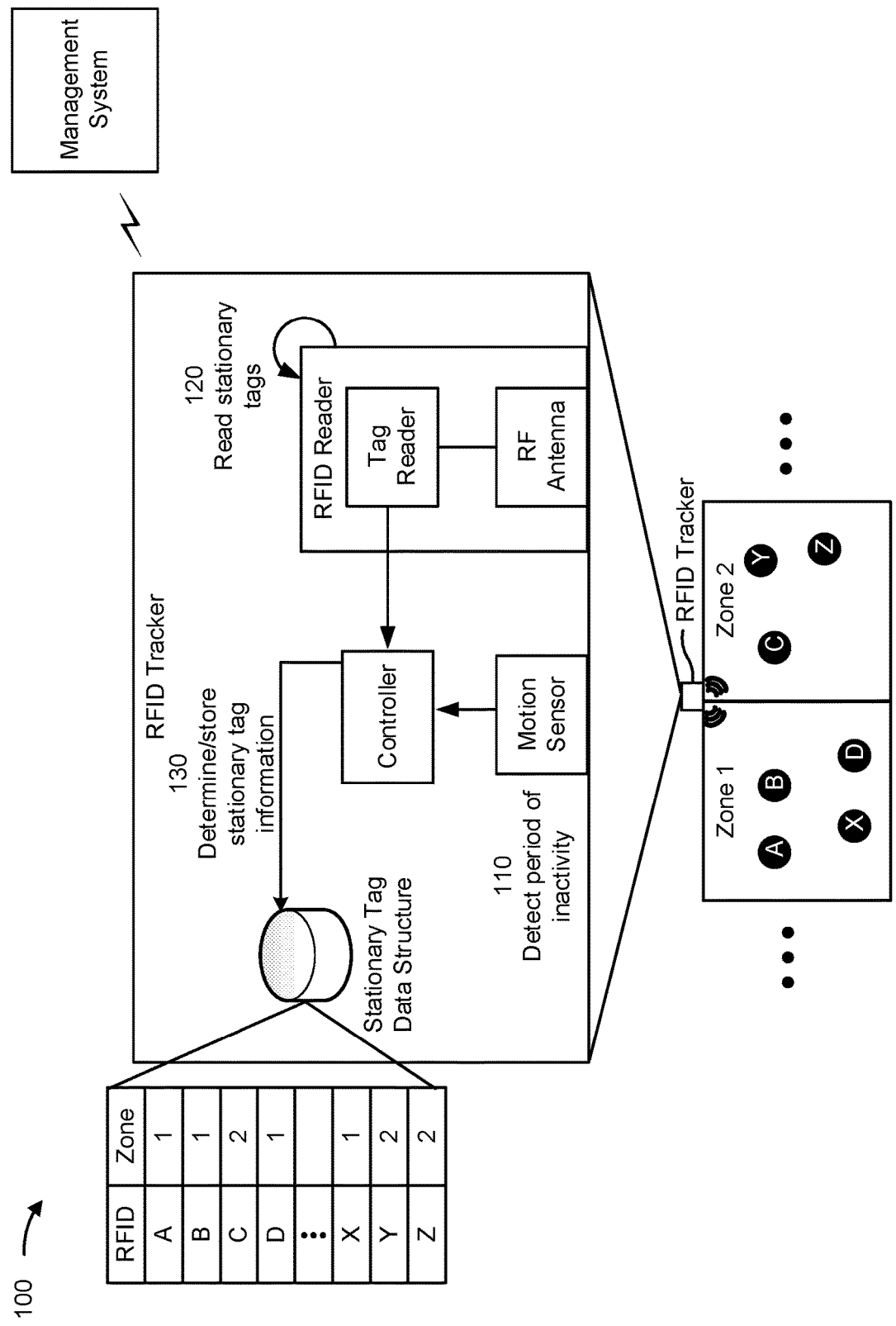
FIG. 1 is a diagram of an example implementation associated with tracking a movement status of a radio frequency identification tag as described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

A system may be configured to track a location or movement of an object or an individual. For example, radio frequency identification (RFID) may be used within a system (an RFID-based system) to determine a location and/or a direction of movement of an object (e.g., a product or equipment). In an RFID-based system, an RFID tag may be embedded within and/or attached to the object and may be mapped to or associated with the object (e.g., using a data structure or a backend platform of the system) to permit the system to infer that the object is in a particular location (e.g., the location of the RFID tag) of a physical environment and/or is moving in a particular direction (e.g., the direction of movement of the RFID tag) within the physical environment. Similarly, an RFID tag may be included within a wearable item (e.g., a bracelet or article of clothing) that is worn by an individual to track the location of the individual.

To track an RFID tag, an RFID-based system uses an RFID reader to emit a read signal to identify RFID tags within a physical environment of the RFID reader based on tag readings (e.g., received response signals) of an RFID tag that are received during a read window (e.g., a time period that follows an emission of the read signal). Based on a known location of the RFID reader within the physical environment, the RFID-based system can infer the location of an RFID tag (and/or an object associated with the tag) based on tag readings of the RFID tag associated with the read window. Furthermore, the RFID-based system may detect and/or identify movement characteristics of the RFID tag based on a variation associated with the tag readings. For example, based on a change in frequency of receiving the response signals and/or a change in signal power of the response signals associated with the tag readings, the RFID-based system can infer that the RFID tag moved within the physical environment.

An organization may use an RFID-based system to track and/or detect movement of an object from one location of a physical environment to another location of the physical environment. For example, a retail organization may use an RFID-based system to track movement of a product from a storage room of a store to a retail side of the store, and/or a construction business may use the system to track movement of equipment from one area of a worksite to another area of the worksite. In such cases, an RFID reader may be placed near a boundary that is between the two locations. However, because of the nature of radio waves used in RFID, radio communications between an RFID reader and an RFID tag are susceptible to interference and/or multipath caused by physical characteristics of the physical environment. For example, a physical object between (e.g., within a line of sight of) an RFID reader and an RFID tag may reflect a read signal and/or response signal. Accordingly, an object that moves through a physical environment can cause variation in tag readings associated with the RFID tag. The RFID-based system may interpret the variation as movement of the RFID tag, despite the fact that the RFID tag did not actually move. Further, in such a case, the RFID-based system may incorrectly interpret that the movement corresponds to movement across a boundary that is between two locations because multipath of the response signals caused the tag readings to incorrectly reflect the same. Therefore, there is a need to verify whether apparent movement of an object associated with the RFID tag corresponds to actual movement of the object.

A camera-based system may use a camera to detect and/or identify an object within a physical environment and/or track the movement of the object within the physical environment with relatively improved accuracy. However, the camera-based system needs to use one or more image processing techniques (e.g., object detection model, an object recognition model, and/or other type of computer vision model that is trained to identify the object) to process images from the cameras in a physical environment. Such image processing techniques are relatively compute intensive, and, therefore, a camera-based system requires consumption of relatively large amounts of computing resources (e.g., processing resources, memory resources, and/or power resources used to capture, analyze, and/or store the images) and/or network resources (e.g., communication resources and/or network bandwidth used to obtain the images) because the images involve relatively large amounts of data (e.g., an image may be one megabyte or more and multiple images may be required in order to identify an object and/or movement of the object).

Some implementations described herein include an RFID tracker, within an RFID-based system, that uses a motion sensor and an RFID reader to determine a movement status of one or more RFID tags in a physical environment. As described herein, based on the motion sensor indicating a period of inactivity in the environment, the RFID tracker may perform an initial read of RFID tags within the physical environment, and determine that RFID tags associated with tag readings associated with the read are stationary RFID tags (e.g., because the motion sensor indicated that there was no motion in the environment during the period of inactivity). When the motion sensor indicates motion within the environment, the RFID tracker may perform a subsequent read, and cross reference tag readings from the subsequent read with the initial read, to determine whether the stationary RFID tags were moved (or remained stationary) and/or whether another RFID tag moved through the environment. Accordingly, the RFID tracker, based on tag readings from the period of inactivity and a period of activity associated with the indicated motion, may disregard any tag readings that indicate that a stationary tag was moved (unless the stationary tag is no longer detected after the period of activity).

In this way, the RFID tracker, as described herein, permits the RFID-based system to more accurately and robustly determine and/or indicate movement of an object within a physical environment (e.g., at least with respect to moving from one designated location to another) relative to other RFID-based systems that do not utilize the RFID tracker as described herein. Therefore, the RFID-based system may operate with less errors and, correspondingly, may operate more efficiently. Furthermore, the RFID tracker may permit an RFID-based system to consume fewer computing resources to identify a location of an object and/or track movement of the object, relative to a camera-based system, because measurements of a motion sensor involve relatively smaller amounts of data than images from a camera, and/or radio frequency (RF) communications between an RFID tag and an RFID reader involve relatively smaller amounts of data than images.

Figure 2:
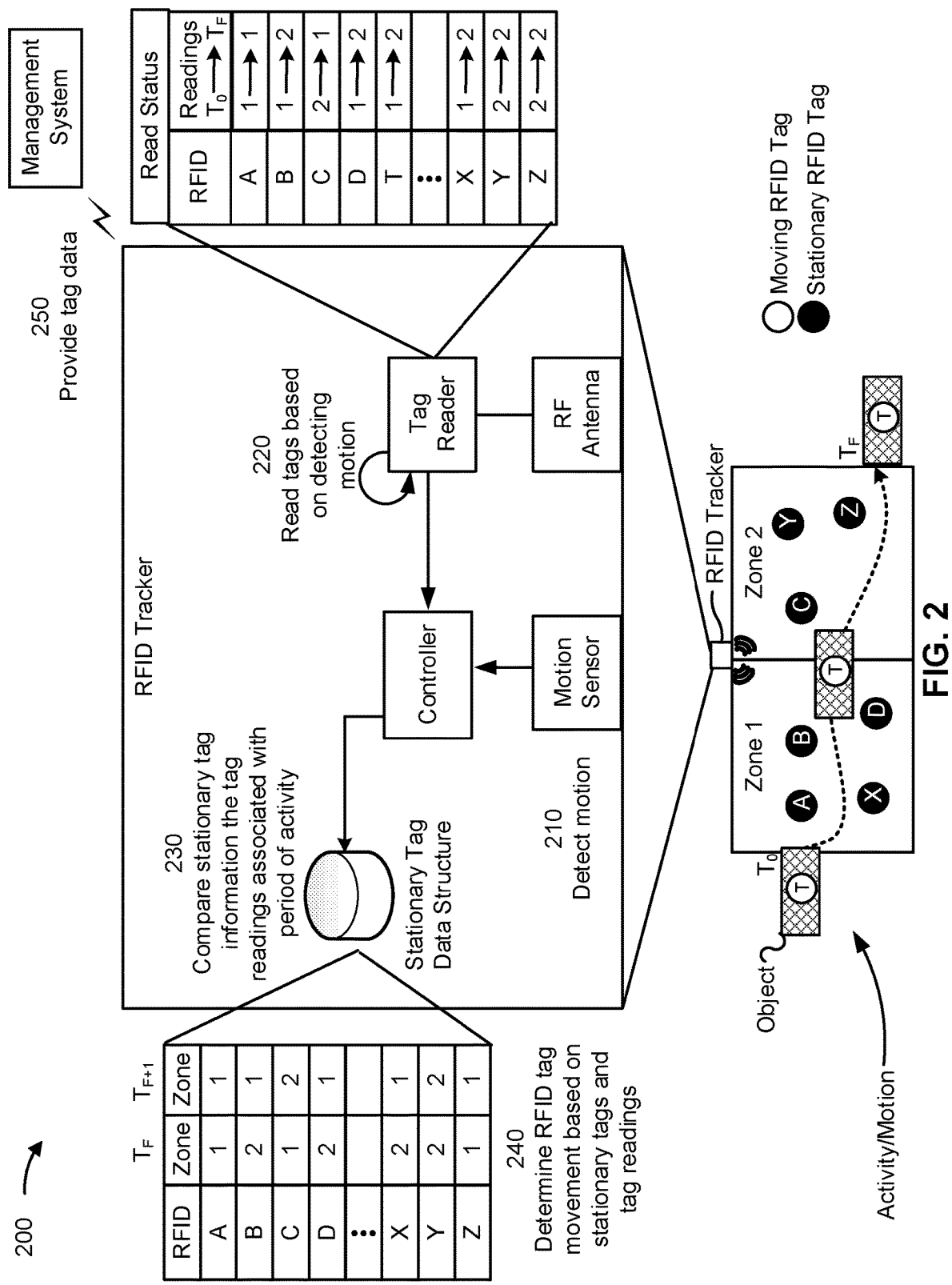
FIG. 2 is diagram of an example implementation described herein.
Figure 3:
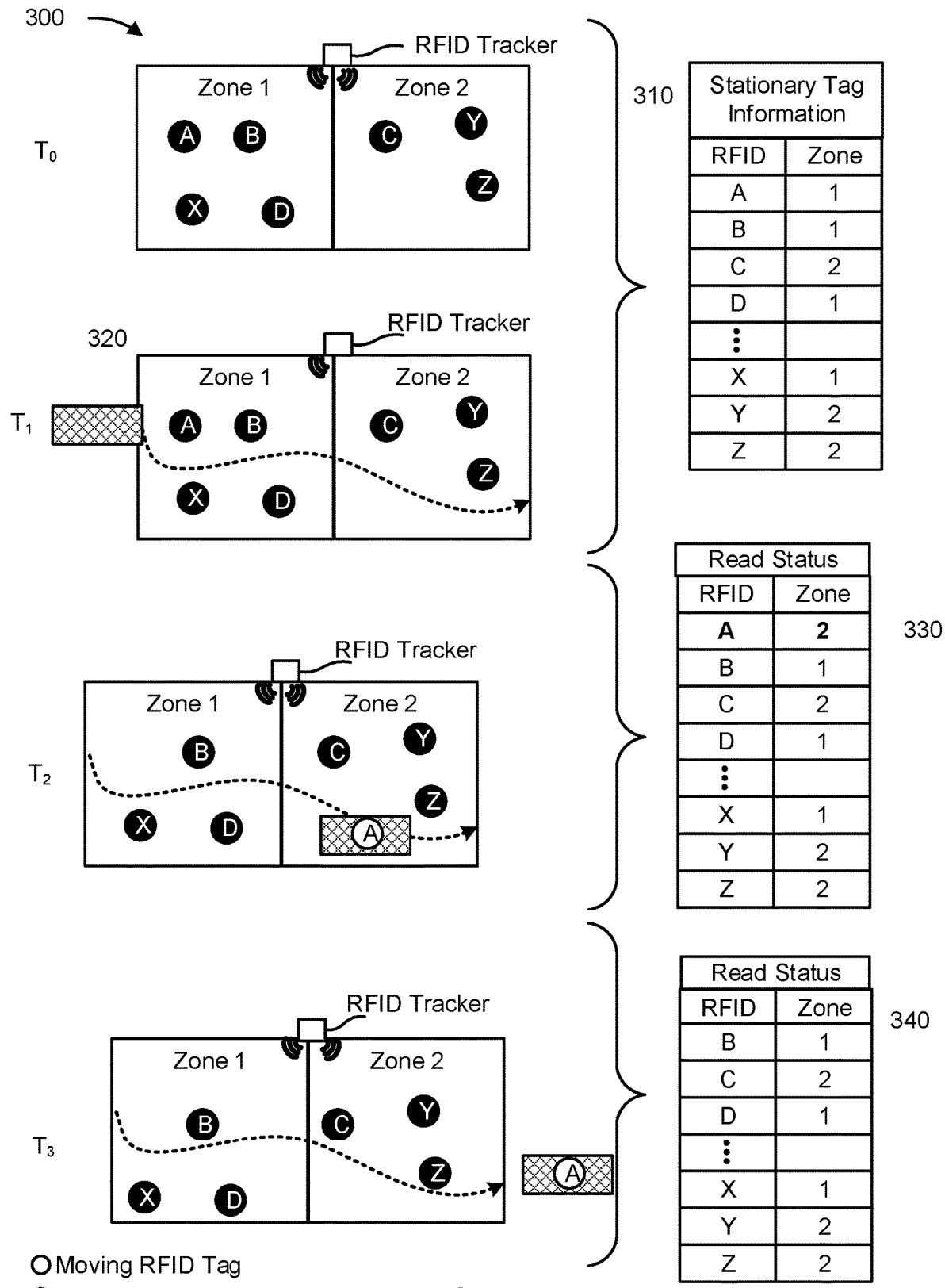
FIG. 3 is a diagram of another example implementation described herein.

FIGS. 1-3 are diagrams of an example implementation 100 associated with tracking a movement status of a radio frequency identification tag. As shown in FIG. 1, example implementation 100 includes an RFID tracker and a management system. The RFID tracker includes an RFID reader with a tag reader and an RF antenna, a motion sensor, a controller, and a stationary tag data structure. These devices are described in more detail below in connection with FIG. 4 and FIG. 5.

In example implementation 100, the RFID tracker uses the motion sensor and the RFID reader to identify stationary RFID tags within a physical environment that includes a first zone (Zone 1) and a second zone (Zone 2). As shown in FIG. 1, the stationary tags of example implementation 100 are labeled as A, B, C, D, X, Y, and Z. The physical environment may correspond to an area or space that is defined by a range of communication of the RFID reader (e.g., which may be based on a signal power of the emitted read signal) and/or a range of detection of the motion sensor. As shown, the RFID tracker may be positioned relative to a boundary between the first zone and the second zone. Accordingly, the first zone may be on a first side of the RFID tracker and may correspond to a first area of the physical environment and the second zone may correspond to a second side of the RFID tracker and may correspond to a second area of the physical environment. As a more specific example, the first zone may correspond to a storage room of a retail store and the second zone may correspond to a sales area of the retail store. In such a case, the RFID tracker may be positioned, for example, over a passageway that permits objects to move from the storage room to the sales area, such as when a product is removed from an inventory storage and shelved for access by a customer in the sales area. While some examples described herein may refer to the RFID tracker being used within a retail environment, other types of environments may similarly use the RFID tracker as described herein to track the movement status of objects and/or RFID tags.

As shown in FIG. 1, and by reference number 110, the RFID tracker detects a period of inactivity. For example, the RFID tracker may monitor the physical environment for motion using the motion sensor. The RFID tracker may detect the period of inactivity based on motion data generated by the motion sensor that indicates that motion has not been detected within the physical environment for a threshold period of time (e.g., 5 seconds or more, 20 seconds or more). The motion data may be captured and/or provided by the motion sensor continuously, periodically, according to a schedule, and/or according to instructions from the controller. In some implementations, the motion sensor may send motion data to the RFID based on detecting motion. In such a case, the RFID tracker may detect a period of inactivity based on an expiration of a threshold period of time without receiving motion data from the motion sensor. The motion sensor may be any suitable motion sensor, such as an infrared sensor, a radar sensor, a lidar sensor, or a camera (e.g., that detects motion based on an optical flow of images from the camera).

As further shown in FIG. 1, and by reference number 120, the RFID tracker reads the stationary tags. The RFID tracker may read the stationary tags by causing the RFID reader to perform a read of RFID tags within the physical environment. The RFID tracker may cause the RFID reader to perform the read based on detecting the period of inactivity in the physical environment. Correspondingly, the RFID reader may collect stationary tag information associated with stationary tags within the physical environment based on detecting the period of inactivity.

In some implementations, the RFID tracker is configured to cause the RFID reader to repeatedly (e.g., continuously, periodically, or according to a schedule) perform a read of RFID tags within the physical environment. In such a case, the RFID tracker, based on a detected period of inactivity passing, may identify and/or collect tag readings that were read during the period of inactivity.

The RFID reader may perform the read by emitting a read signal and receiving response signals during a read window. As used herein, a response signal from an RFID tag that is received within the read window of a read operation corresponds to tag reading of the RFID. The tag reading may include an identifier of the RFID tag based on the identifier being included within the response signal from the RFID tag. Accordingly, a particular tag reading may be associated with a particular RFID tag within the tag information based on the identifier.

In some implementations, the RFID tags may be configured to continuously emit response signals for a period of time after receiving the read signal. A duration of the period of time, during which the RFID tags are to emit response signals, may be based on a duration of the read window of the RFID reader. In some implementations, an RFID tag may be a passive RFID tag that is powered by a received read signal. In such a case, the RFID tag may continuously emit the response signal until absorbed power from the read signal is completely consumed.

As further shown in FIG. 1, and by reference number 130, the RFID tracker determines and/or stores stationary tag information. The stationary tag information may include readings of the RFID tags that are received in association with the period of inactivity (e.g., during the period of inactivity and/or after the period of inactivity is detected). Accordingly, the stationary tag information may include and/or identify which RFID tags are within the physical environment (based on the RFID tags being within RF communication range of the RF reader).

An RFID tag within the physical environment may continuously emit response signals based on receiving the read signal. Accordingly, the RFID tracker may determine a distance between the RF antenna and the RFID tag based on a quantity of tag readings associated with the RFID reader (e.g., a quantity of the response signals that are received by the RFID reader) received during a read window. For example, the RFID tracker may determine that a relatively higher quantity of tag readings received in a read window corresponds to the RFID tag being nearer the RFID reader (e.g., because relatively more time is typically required for response signals from relatively further RFID tags to reach the RFID reader) and that a relatively lower quantity of tag readings corresponds to the RFID tag being further from the RFID reader (e.g., because relatively more time is typically required for response signals from relatively further RFID tags to reach the RFID reader).

Referring to FIG. 1, the RFID tracker may determine that tag B is closer to the RFID tracker than Tag A based on receiving more response signals from Tag B than Tag A during the read window. Accordingly, based on a known location of the RFID reader and the quantity of response signals that are received from the RFID tag within the read window, the RFID tracker system can infer that a particular RFID tag (and/or an object associated with the RFID tag) is within a corresponding distance of the known location that is determined from the quantity of tag readings associated with the RFID tag.

The RF antenna may include multiple antennas that are physically configured in a particular manner that permits the RFID reader and/or RFID tracker to determine a direction from which response signals from the stationary tags are received. For example, a first RF antenna that is positioned toward Zone 1 may receive more response signals from Tag A than a second RF antenna that is positioned toward Zone 2, because the first RF antenna is physically closer to Tag A than the second RF antenna. Accordingly, the RFID tracker may determine the movement status according to a pattern of the reads associated with which RF antennas of the tag reader respectively read the RFID tag. Accordingly, as shown, the RFID tracker may store location information associated with the stationary tags in the stationary tag data structure. The location information may indicate that a particular RFID tag is located in a particular zone of the physical environment.

In this way, the RFID tracker may identify RFID tags that are (or were) stationary during a particular period of inactivity. As described herein, the RFID tracker may use the stationary tag information to determine, relative to a period of activity detected by the motion sensor, whether one of the stationary tags, or another RFID tag that was not identified as stationary, is associated with movement of an object during the period of activity.

In example implementation 200 of FIG. 2, the RFID tracker uses the motion sensor and the RFID reader to determine that an RFID tag moved within and/or through the physical environment (e.g., from Zone 1 to Zone 2). As shown in FIG. 2, and by reference number 210, the RFID tracker detects motion within the physical environment. For example, as shown, the motion sensor may detect an object entering Zone 1 at time $T_0$, passing through the physical environment, and exiting Zone 2 at time $T_F$. The time period from time $T_0$ to time $T_F$ may correspond to a period of activity described herein.

As shown, the object is associated with a moving RFID tag (Tag T). Referring to the retail example above, the object may be a product that is being moved from a storage room of a retail store to a sales side of a retail store. Accordingly, the motion sensor may detect the period of activity based on detecting movement of the object (e.g., by detecting an individual carrying the object, by detecting the movement of the object, and/or by detecting the movement of a cart that is transporting the object).

As further shown in FIG. 2, and by reference number 220, the RFID tracker reads the tags based on detecting the motion. The RFID tracker may similarly cause the RFID reader to perform the read as described elsewhere herein. Accordingly, as shown, the RFID tracker may determine that Tag T is within the physical environment from time $T_0$ to time $T_F$.

The RFID tracker may process the tag readings of the RFID tags to determine movement characteristics associated with the RFID tags. The movement characteristics may include a starting location of the RFID tag, an ending location of the RFID tag, a direction of the movement of the RFID tag, and/or a speed of the RFID tag, among other examples. The RFID tracker may use any suitable analysis to determine the movement characteristics. As a specific example, the RFID tracker, based on a known location of the RFID reader and/or a physical configuration of the RF antennas of the RFID reader, may use a slope analysis to determine the direction of movement of the RFID tags from time $T_0$ to time $T_F$. However, the movement of the object through the physical environment may affect tag readings of the RFID tags in the physical environment and cause the tag readings to incorrectly indicate or represent movement of one or more of the stationary RFID tags in the physical environment.

As described elsewhere herein, the movement of the object may cause multipath of response signals to provide readings that incorrectly reflect movement characteristics of some of the RFID tags in the physical environment. For example, as shown, the tag reader may determine a read status of the RFID tags in the physical environment. More specifically, the RFID reader may collect readings from time $T_0$ to time $T_F$ that correctly indicate that Tag A remained stationary, that incorrectly indicate that Tag B moved from Zone 1 to Zone 2, that incorrectly indicate that Tag C moved from Zone 2 to Zone 1, that incorrectly indicate that tag D moved from Zone 1 to Zone 2, that correctly indicate that Tag T moved from Zone 1 to Zone 2, that incorrectly indicate that Tag Y moved from Zone 1 to Zone 2, that correctly indicate that Tag Y remained stationary, and that correctly indicate that Tag Z remained stationary. As described herein, the RFID tracker may utilize the stationary tag information to verify that the RFID tags that appeared to move during the period of activity actually moved during the period of activity.

As further shown in FIG. 2, and by reference number 230, the RFID tracker compares the stationary tag information and the tag readings associated with the period of activity. In some implementations, the RFID tracker may compare the stationary tag information and the tag readings after the period of activity (e.g., after $T_F$) to identify a difference between tag readings from the period of activity and tag readings from the period of inactivity. For example, the difference may correspond to a difference in a quantity of RFID tags read during the period of activity and a quantity of RFID tags read during the period of inactivity. Additionally, or alternatively, the difference may correspond to a difference between a set of RFID tags that were read (or identified in the physical environment) during the period of activity and the set of RFID tags that were read during the period of inactivity.

The RFID tracker may compare the stationary tag information with the tag readings from the period of activity to determine whether any of the stationary tags moved and/or whether the period of activity was associated with movement of another RFID tag. For example, as described herein, if tag readings at a time T after the period of activity (time $T_{F+1}$) are associated with a same set of RFID tags identified in the stationary tag information, the RFID tracker may infer and/or determine that the stationary tags remained stationary. On the other hand, if an RFID tag in the stationary information is not read at time $T_{F+1}$, the RFID tracker may infer that the RFID tag was moved according to tag readings.

As further shown in FIG. 2, and by reference number 240, the RFID tracker determines RFID tag movement based on the stationary tag information and the tag readings associated with the period of activity. As shown, Tag T is not identified in the stationary tag information. Accordingly, based on a comparison of the RFID tags identified in the stationary tag information and the tag readings obtained during the period of activity, the RFID tracker may determine that tag T was not a previously identified stationary tag. Correspondingly, the RFID tracker may determine that Tag T moved within the physical environment during the period of activity.

Furthermore, the RFID tracker may determine that a set of RFID tags that are identified after the period of activity (e.g., at time $T_{F+1}$) and that were identified during the period of inactivity correspond to RFID tags that remained stationary (and/or were not moved in association with the detected motion). Correspondingly, as shown, the RFID tracker may reset the determined locations of the RFID tags from the tag readings associated with the period of activity to the determined locations of the RFID tags from the stationary information.

As further shown in FIG. 2, and by reference number 250, RFID tracker provides tag data to the management system. For example, the RFID tracker may indicate a movement status of Tag T. The movement status may indicate that Tag T moved from Zone 1 to Zone 2 (as determined by an analysis of the readings during the period of activity). Additionally, or alternatively, the tag data may indicate which of the RFID tags are stationary and/or which of the tags in the environment remained stationary during the period of activity.

In some implementations, the tag data indicate a location associated with a movement status of the RFID tags in the physical environment. For example, based on the RFID tracker (and/or motion sensor) being positioned at a particular location within the physical environment, the RFID tracker may be mapped to the particular location (e.g., using a locationing system or a grid system). Accordingly, based on the RFID tracker providing the tag data, the management system may determine that a movement status that indicates movement of Tag T corresponds to movement of Tag T relative to a particular location. More specifically, the movement status and/or tag data may indicate that the RFID tag moved through or within an area of the physical environment (e.g., an area between Zone 1 and Zone 2, such as a passageway or other type of threshold) that is associated with or mapped to the RFID tracker.

The management system may correspond to a backend system that manages and/or maintains information received from the RFID tracker. For example, the management system may store the received tag data in a data structure to maintain and/or indicate the location of RFID tags within the physical environment. Additionally, or alternatively, the management system may provide corresponding tag data and/or tag location information to a user (e.g., via a user interface of the management system and/or a user device). In this way, an individual may monitor and/or detect movement of RFID tags (and associated objects) within the physical environment and/or relative to particular areas of the physical environment.

In some implementations, the RFID tracker may be one of multiple RFID trackers that are included within the physical environment of example. For example, there may be two passageways, Door 1 and Door 2, between the first zone and the second zone. A first RFID tracker may be positioned over (or relatively closer to) Door 1 and a second RFID tracker may be positioned over Door 2. In such a case, the management system may receive motion data and tag readings from the first RFID tracker and the second RFID tracker (e.g., within respective sets of movement information from the multiple RFID trackers). Further, the tag readings from both the first RFID tracker and the second RFID tracker may indicate that a particular RFID tag moved from the first zone to the second zone. However, using the motion data from the individual RFID trackers, the management system may determine that the RFID tag (and associated object) moved through either Door 1 or Door 2. Additionally, or alternatively, the RFID tracker may specify and/or indicate a specific passageway through which an RFID tag (and/or associated object) was moved.

In example implementation 300 of FIG. 3, the RFID tracker uses the motion sensor and the RFID reader to determine that a previously stationary RFID tag (Tag A) has moved. As shown in FIG. 3, and by reference number 310, at time $T_0$, the RFID tracker identifies tags in the physical environment and/or zones in which the stationary tags are located, as described elsewhere herein.

As further shown in FIG. 3, and by reference number 320, the RFID tracker detects motion within the physical environment. For example, as shown, the motion sensor may detect an object entering Zone 1 at time $T_1$. The object, at time $T_1$, is not associated with an RFID tag (e.g., the object may correspond to an empty cart used to transport products associated with the RFID tags). Accordingly, as shown, the RFID tracker may identify a same set of RFID tags that were identified during a period of inactivity that preceded time $T_0$, as described above.

As further shown in FIG. 3, and by reference number 330, at time $T_2$, the object is moving Tag A through Zone 2. For example, between time $T_1$ and time $T_2$, the object may have picked up Tag A (or a product associated with Tag A) and moved Tag A across the boundary between Zone 1 and Zone 2. Accordingly, as shown by the reading status, at time $T_2$, the RFID tracker may determine that Tag A is located in Zone 2 according to tag readings that are associated with a period of activity that is between time $T_1$ and time $T_2$.

As further shown in FIG. 3, and by reference number 340, at time $T_3$, the object and Tag A are outside of the physical environment. Correspondingly, the RFID tracker may determine that tag readings at time $T_3$ indicate that Tag A is missing and/or has been removed from the physical environment. Accordingly, the RFID tracker may determine that the previously stationary Tag A was moved during the period of activity associated with time $T_1$ to a time $T_3$. For example, based on determining that the RFID reader did not read Tag A during a portion of time $T_1$ to time $T_3$ (e.g., an end portion of the period of activity), the RFID tracker may determine that Tag A was moved from Zone 1 into Zone 2 (according to a slope analysis of the tag readings of Tag A) and/or that Tag A was removed from Zone 2 (based on the RFID reader not receiving any response signals from Tag A due to Tag A being outside of the physical environment.

In this way, the RFID tracker may use a motion sensor and an RFID reader to track movement statuses and/or location of RFID tags within a physical environment. In this way, RFID reader may determine a location of an RFID tag and/or a direction of movement of an RFID tag with improved accuracy relative to systems that do not include an RFID tracker as described herein.

As indicated above, FIGS. 1-3 are provided as examples. Other examples may differ from what is described with regard to FIGS. 1-3. The number and arrangement of devices shown in FIGS. 1-3 are provided as an example. In practice, there may be additional devices, fewer devices, different devices, or differently arranged devices than those shown in FIGS. 1-3. Furthermore, two or more devices shown in FIGS. 1-3 may be implemented within a single device, or a single device shown in FIG. 3 may be implemented as multiple, distributed devices. Additionally, or alternatively, a set of devices (e.g., one or more devices) shown in FIGS. 1-3 may perform one or more functions described as being performed by another set of devices shown in FIGS. 1-3.

Figure 4:
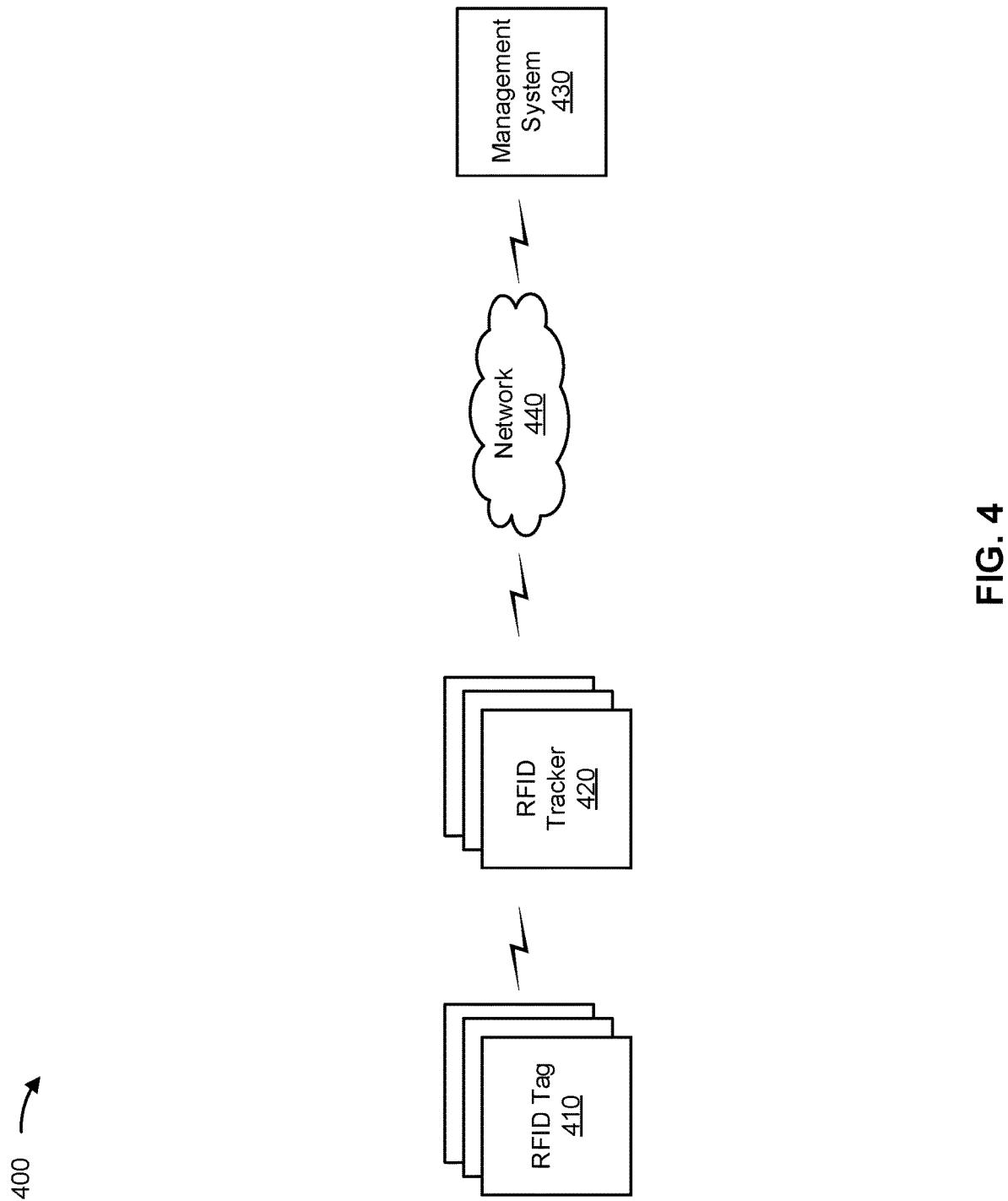
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include one or more RFID tags 410, an RFID tracker 420, a management system 430, and a network 440. Devices of environment 400 may interconnect via wired connections, wireless connections, or a combination of wired and wireless connections.

The RFID tag 410 includes one or more devices capable of receiving, generating, storing, processing, and/or providing information associated with tracking movement of an object in a physical environment. For example, the RFID tag may include a receiver, a transmitter, a transceiver, and/or a memory that stores an identifier of the RFID tag. The RFID tag 410 may be a passive RFID tag powered by received signals and/or an active RFID tag that is powered by a battery or other type of power supply.

The RFID tracker 420 includes one or more devices capable of receiving, generating, storing, processing, and/or providing information associated with tracking a movement status of an RFID tag (e.g., the RFID tag 410). The RFID tracker 420 may include an RFID reader and/or a sensor (e.g., a motion sensor) as described elsewhere herein.

The management system 430 includes one or more devices capable of receiving, generating, storing, processing, providing, and/or routing information associated with tracking movement of an object and/or an RFID tag (e.g., the RFID tag 410) in a physical environment, as described elsewhere herein. The management system 430 may include a communication device and/or a computing device. For example, the management system 430 may include a server, such as an application server, a client server, a web server, a database server, a host server, a proxy server, a virtual server (e.g., executing on computing hardware), or a server in a cloud computing system. In some implementations, the management system 430 includes computing hardware used in a cloud computing environment.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
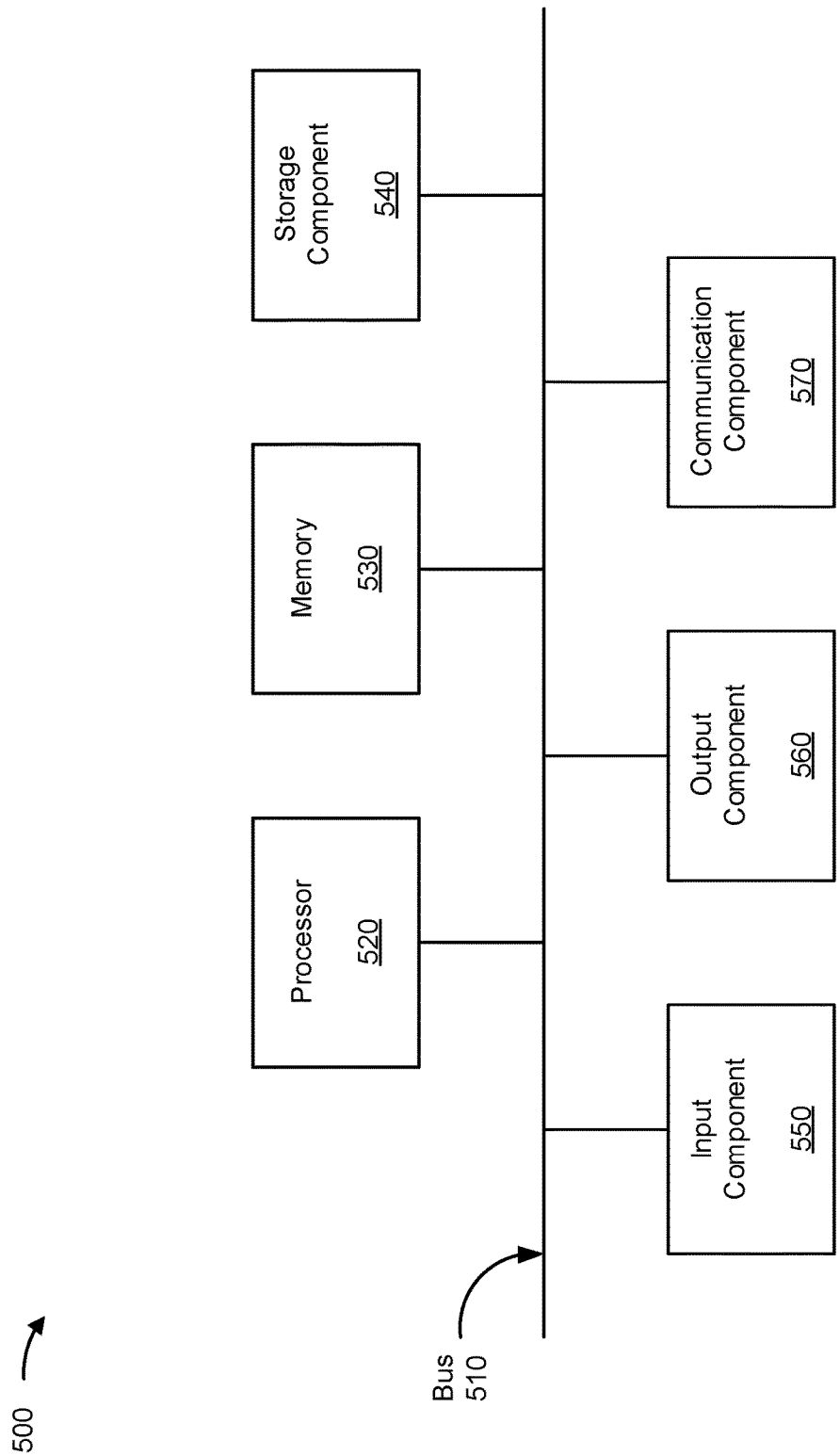
FIG. 5 is a diagram of example components of one or more devices of FIG. 4.

FIG. 5 is a diagram of example components of a device 500, which may correspond to the RFID tracker 420 and/or the management system 430. In some implementations, the RFID tracker 420 and/or the management system 430 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
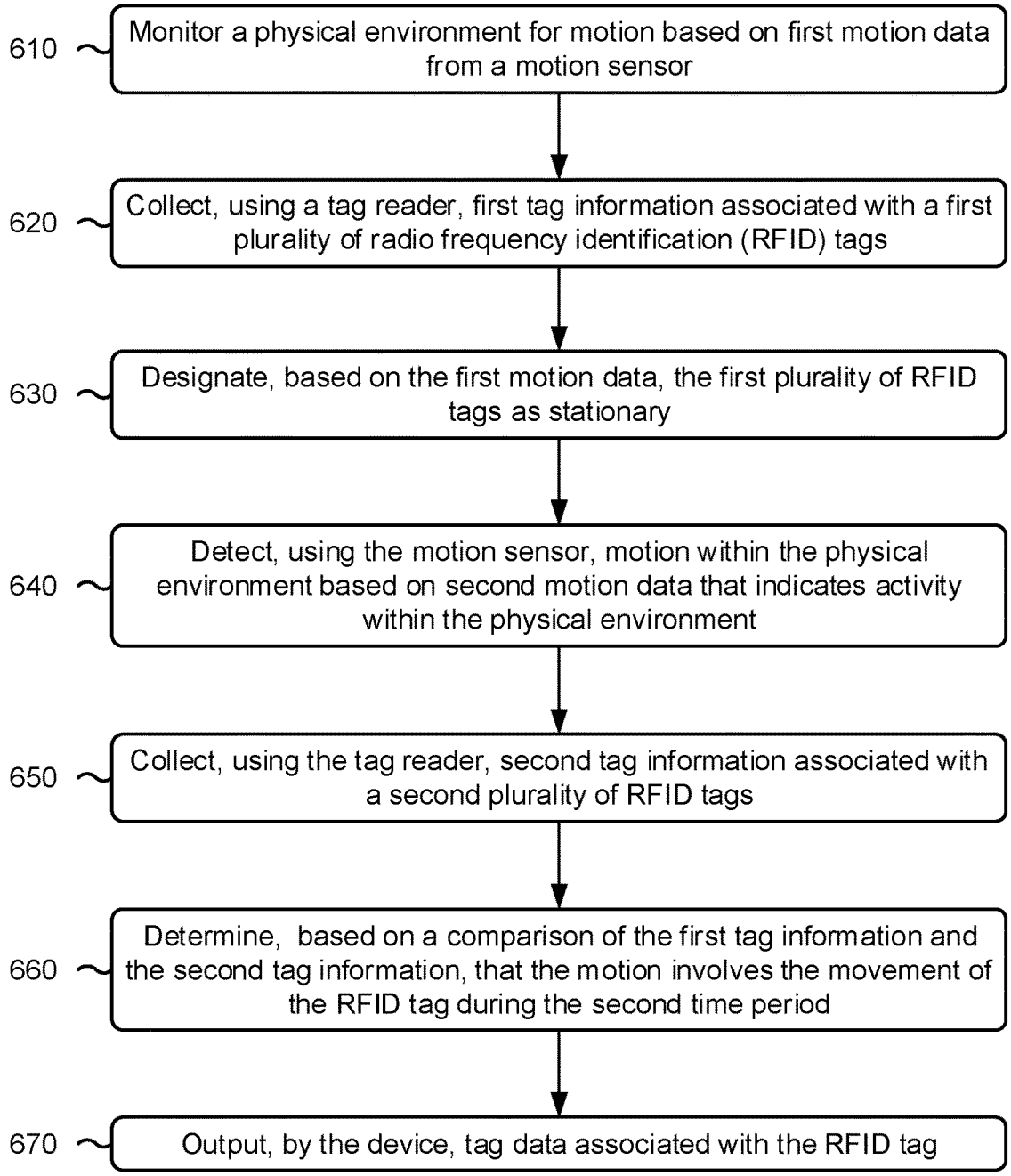
FIG. 6 is a flowchart of an example process relating to tracking a movement status of a radio frequency identification tag.

FIG. 6 is a flowchart of an example process 600 associated with tracking a movement status of a radio frequency identification tag. In some implementations, one or more process blocks of FIG. 6 may be performed by an RFID tracker (e.g., RFID tracker 420). In some implementations, one or more process blocks of FIG. 6 may be performed by another device or a group of devices separate from or including the RFID tracker, such as a management system (e.g., the management system 430). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include monitoring a physical environment for motion based on first motion data from a motion sensor (block 610). For example, the RFID tracker may monitor a physical environment for motion based on first motion data from a motion sensor, as described above. In some implementations, the first motion data is received from the motion sensor in association with a first time period and indicates inactivity within the physical environment.

As further shown in FIG. 6, process 600 may include collecting, using a tag reader, first tag information associated with a first plurality of RFID tags (block 620). For example, the RFID tracker may collect, using a tag reader, first tag information associated with a first plurality of RFID tags, as described above. In some implementations, the first tag information is collected during the first time period.

As further shown in FIG. 6, process 600 may include designating, based on the first motion data, the first plurality of RFID tags are the first plurality of RFID tags as stationary (block 630). For example, the RFID tracker may designate, based on the first motion data, the first plurality of RFID tags as stationary, as described above.

As further shown in FIG. 6, process 600 may include detecting, using the motion sensor, motion within the physical environment based on second motion data that indicates activity within the physical environment (block 640). For example, the RFID tracker may detect, using the motion sensor, motion within the physical environment based on second motion data that indicates activity within the physical environment, as described above.

As further shown in FIG. 6, process 600 may include collecting, using the tag reader, second tag information associated with a second plurality of RFID tags (block 650). For example, the RFID tracker may collect, using the tag reader, second tag information associated with a second plurality of RFID tags, as described above. In some implementations, the second tag information is collected in association with a second time period that is associated with receiving the second motion data. In some implementations, the first tag information includes respective identifiers of RFID tags of the first plurality of RFID tags and the second tag information includes respective identifiers of RFID tags of the second plurality of RFID tags.

As further shown in FIG. 6, process 600 may include determining, based on a comparison of the first tag information and the second tag information, that the motion involves a movement of an RFID tag during the second time period (block 660). For example, the RFID tracker may determine, based on a comparison of the first tag information and the second tag information, that the motion involves a movement of an RFID tag during the second time period, as described above.

In some implementations, determining that the motion involves the movement of the RFID tag comprises determining that the RFID tag is not stationary based on the comparison indicating that the RFID tag is identified in the second tag information and that the RFID tag is not identified in the first tag information. Additionally, or alternatively, determining that the motion involves the movement of the RFID tag may include determining, based on the comparison, that the first RFID tag is identified in the first tag information and the second tag information, determining that the second tag information indicates that a tag reading from the RFID tag was not received during a portion of the second time period, determining, based on the second tag information indicating that a tag reading from the RFID tag was not received during the portion of the second time period, that the RFID tag is not relative to the second time period, and removing, from a data structure associated with the first tag information, an identifier of the RFID tag.

As further shown in FIG. 6, process 600 may include outputting tag data associated with the RFID tag moving (block 670). For example, the RFID tracker may output tag data associated with the RFID tag, as described above.

In some implementations, process 600 includes identifying the RFID tag based on a difference between first readings of the RFID tag in the first tag information and second tag readings of the RFID tag in the second tag information. The first tag readings may be associated with an identifier of the RFID tag in the first tag information, and the second tag readings may be associated with the identifier in the second tag information. In some implementations, process 600 includes generating the tag data to include the identifier of the RFID tag in association with the motion.

In some implementations, process 600 includes, prior to outputting the tag data, identifying, from the second tag information, an identifier of the RFID, determining, based on tag readings associated with the identifier in the second tag information, a direction of movement of the RFID tag, and generating the tag data to include the identifier in association with the direction of movement.

In some implementations, determining the direction of movement comprises identifying a first subset of the tag readings that are received via a first RF antenna of the tag reader, identifying a second subset of the tag readings that are received via a second RF antenna of the tag reader, and determining the direction of movement based on a physical configuration of the first RF antenna relative to the second RF antenna, a quantity of the first subset of the tag readings, and a quantity of the second subset of the tag readings.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method for detecting a movement of an RFID tag among a plurality of stationary RFID tags, comprising:
    monitoring, by a device, a physical environment for motion based on first motion data from a motion sensor, wherein the first motion data is received from the motion sensor in association with a first time period and indicates inactivity within the physical environment;
    collecting, by the device and using a tag reader, first tag information associated with a first plurality of radio frequency identification (RFID) tags, wherein the first tag information is collected during the first time period;
    designating, by the device and based on the first motion data, the first plurality of RFID tags as stationary;
    detecting, by the device and using the motion sensor, motion within the physical environment based on second motion data that indicates activity within the physical environment;
    collecting, by the device and using the tag reader, second tag information associated with a second plurality of RFID tags, wherein the second tag information is collected in association with a second time period that is associated with receiving the second motion data;
    determining, by the device and based on a comparison of the first tag information and the second tag information, that the motion involves the movement of the RFID tag during the second time period; and
    outputting, by the device, tag data associated with the RFID tag.

2. The method of claim 1, wherein determining that the motion involves the movement of the RFID tag comprises:
    determining that the RFID tag is not stationary based on the comparison indicating that the RFID tag is identified in the second tag information and that the RFID tag is not identified in the first tag information.

3. The method of claim 1, further comprising, prior to outputting the tag data:
    identifying the RFID tag based on a difference between first tag readings of the RFID tag in the first tag information and second tag readings of the RFID tag in the second tag information,
    wherein the first tag readings are associated with an identifier of the RFID tag in the first tag information and the second tag readings are associated with the identifier in the second tag information; and
    generating the tag data to include the identifier of the RFID tag in association with the motion.

4. The method of claim 1, wherein determining that the motion involves the movement of the RFID tag comprises:

determining, based on the comparison, that the first RFID tag is identified in the first tag information and the second tag information;

determining that the second tag information indicates that a tag reading from the RFID tag was not received during a portion of the second time period;

determining, based on the second tag information indicating that a tag reading from the RFID tag was not received during the portion of the second time period, that the RFID tag is not relative to the second time period; and removing, from a data structure associated with the first tag information, an identifier of the RFID tag.

5. The method of claim 1, further comprising, prior to outputting the tag data:

identifying, from the second tag information, an identifier of the RFID;

determining, based on tag readings associated with the identifier in the second tag information, a direction of movement of the RFID tag; and generating the tag data to include the identifier in association with the direction of movement.

6. The method of claim 5, wherein determining the direction of movement comprises:

identifying a first subset of the tag readings that are received via a first radio frequency (RF) antenna of the tag reader;

identifying a second subset of the tag readings that are received via a second RF antenna of the tag reader; and determining the direction of movement based on:
a physical configuration of the first RF antenna relative to the second RF antenna,
a quantity of the first subset of the tag readings, and
a quantity of the second subset of the tag readings.

7. The method of claim 1, wherein the first tag information includes respective identifiers of RFID tags of the first plurality of RFID tags and the second tag information includes respective identifiers of RFID tags of the second plurality of RFID tags.

8. A device, comprising:
one or more memories; and
one or more processors, communicatively coupled to the one or more memories, configured to:
identify, using a tag reader, a first plurality of radio frequency identification (RFID) tags that are stationary within a physical environment,
wherein the first plurality of RFID tags are identified as stationary based on first tag information collected during a period of inactivity within the physical environment;
detect, using a motion sensor, motion within the within the physical environment;
collect, using the tag reader, second tag information associated with a second plurality of RFID tags,
wherein the second tag information is collected in association with a period of activity that is associated with the motion;
determine, based on the first tag information and the second tag information, that an RFID tag of the second plurality of RFID tags moved during the period of activity; and
perform an action associated with indicating that the RFID tag moved during the period of activity.

9. The device of claim 8, wherein the one or more processors, when identifying the first plurality of RFID tags, are configured to:

detect, using the motion sensor, inactivity within the physical environment based on motion data associated with the period of inactivity;

collect, using the tag reader, the first tag information that identifies the first plurality of RFID tags; and determine, based on the inactivity in the physical environment during the first time period, that the first plurality of RFID tags are stationary relative to the period of inactivity.

10. The device of claim 8, wherein the one or more processors, when determining that the RFID tag of the second plurality of RFID tags moved, are configured to:

determine that the RFID tag is not stationary during the period of activity based on an identifier of the RFID not being identified in the first tag information.

11. The device of claim 8, wherein the one or more processors, when determining that the RFID tag moved during the period of activity, are configured to:

determine, based on the first tag information, that the RFID tag is not one of the first plurality of RFID tags;

determine, based on determining that the RFID tag is not one of the first plurality of RFID tags, that the RFID tag is not stationary; and determine that the motion involves a movement of the RFID tag based on determining that the RFID tag is not stationary.

12. The device of claim 8, wherein the one or more processors, when determining that the RFID tag moved during the period of activity, are configured to:

determine that the RFID tag is identified in the first tag information and the second tag information;

determine that tag readings in the second tag information indicate that a tag reading from the RFID tag was not received after the period of activity;

determine, based on the second tag information and the tag readings, that the RFID tag moved during the period of activity; and remove, from a data structure associated with the first tag information, an identifier of the RFID tag.

13. The device of claim 8, wherein the one or more processors are further configured to:

prior to performing the action, identify tag readings, within the second tag information, associated with the RFID tag;

determine, based on the tag readings and a duration of the period of activity, a movement characteristic of the RFID tag during the period of activity; and generate tag data to indicate the movement characteristic.

14. The device of claim 13, wherein the movement characteristic comprises at least one of:
a starting location of the RFID tag;
an ending location of the RFID tag;
a direction of movement of the RFID tag; and
a speed of the RFID tag.

15. A system, comprising:
a motion sensor;
a tag reader; and
a controller that is configured to:
receive, from the motion sensor, an inactivity indication that indicates a period of inactivity within a physical environment;
store, in a data structure, identifiers of a plurality of RFID tags that the tag reader read during the period of inactivity;
receive, from the motion sensor, a motion notification that indicates a period of activity within the physical environment;

cause the tag reader to collect an identifier of an RFID tag in the physical environment during the period of activity;

determine, based on the identifier and the identifiers of the plurality of RFID tags, a movement status associated with the RFID tag during the period of activity; and perform an action associated with the movement status of the RFID tag.

16. The system of claim 15, wherein the controller is configured to cause the tag reader to read the identifier based on receiving the motion notification.

17. The system of claim 15, wherein the controller, when causing the tag reader to collect the identifier, is configured to:

cause the tag reader to iteratively perform a read the RFID tag during the period of activity, wherein the movement status of the RFID tag is determined based on:

a quantity of reads of the RFID tag performed by the tag reader during the period of activity, and a pattern of the reads associated with which radio frequency (RF) antennas of the tag reader respectively read the RFID tag.

18. The system of claim 15, wherein the controller, when determining the movement status, is configured to:

determine that the identifier of the RFID tag corresponds to one of the identifiers of the plurality of RFID tags; and determine, based on the tag reader not reading the RFID tag after the period of activity, that the RFID tag was moved during the period of activity.

19. The system of claim 15, wherein the controller, when determining the movement status, is configured to:

determine that the identifier of the RFID tag does not correspond to one of the identifiers of the plurality of RFID tags; and determine, based on the identifier of the RFID tag not corresponding to one of the identifiers of the plurality of RFID tags, that the RFID tag was moved during the period of activity.

20. The system of claim 15, wherein the controller, when performing the action, is configured to:

determine that the movement status corresponds to movement of the RFID tag within the physical environment;

identify a location of the motion sensor; and provide an indication that the RFID tag moved through an area of the physical environment that is associated with the location.

* * * * *